United States Patent [19]

Gaither et al.

[11] Patent Number: 4,864,516

[45] Date of Patent: Sep. 5, 1989

[54] METHOD FOR IMPLEMENTING AN ON-LINE PRESENTATION IN AN INFORMATION PROCESSING SYSTEM

[75] Inventors: William D. Gaither, Marietta, Ga.; Laura T. Giovannetti, Austin, Tex.; Robert J. Grafe, Austin, Tex.; Linda F. Hall, Austin, Tex.; Gregory P. Meyer, Austin, Tex.; Steven T. Pancoast, Austin, Tex.

[73] Assignee: International Business Machines Corporation, Armonk, N.Y.

[21] Appl. No.: 837,996

[22] Filed: Mar. 10, 1986

[51] Int. Cl.⁴ .............................................. G06F 15/40
[52] U.S. Cl. ..................................... 364/518; 364/521
[58] Field of Search ............... 364/518, 521, 522, 523; 340/747, 790, 328, 750, 732, 723

[56] References Cited

U.S. PATENT DOCUMENTS

| | | | |
|---|---|---|---|
| 3,925,770 | 12/1975 | Beacham | 340/328 |
| 4,435,777 | 3/1984 | McCaskill et al. | 364/900 |
| 4,454,576 | 6/1984 | McInroy et al. | 364/200 |
| 4,467,363 | 4/1984 | Tench, Jr. | 364/523 |
| 4,503,515 | 3/1985 | Cuan et al. | 364/900 |
| 4,521,870 | 6/1985 | Babbel et al. | 364/900 |
| 4,601,003 | 7/1986 | Yoneyama et al. | 340/790 |
| 4,616,327 | 10/1986 | Rosewaine et al. | 364/518 |
| 4,639,721 | 1/1987 | Eto et al. | 340/747 |
| 4,649,513 | 3/1987 | Martin et al. | 364/900 |
| 4,677,571 | 6/1987 | Riseman et al. | 364/519 |
| 4,742,473 | 5/1988 | Shugar et al. | 364/518 |
| 4,760,388 | 7/1988 | Tatsumi et al. | 340/717 |
| 4,764,867 | 8/1988 | Hess | 364/200 |

OTHER PUBLICATIONS

Borkin et al., "Some Issues in the Design of an Editor—Formatter for Structured Documents", IBM Tech., Report No. G320-2136, 9/81.

Kodaira et al., "Interactive Robot Programming with Real Time Graphic Simulation", IECON '84, pp. 35–39.
Myers B. A., "The User Interface for Sapphire", IEEE CG&A, Dec. 1984, pp. 13–23.
Prager et al., "Polite Project Progress Report", IBM Cambridge Scientific Center Report No. G320-2140, 4/82.
Anderson D. C., "Closing the Gap: A Workstation—Main Frame Connection", Computer in Mechanical Engineering, 5/86, pp. 16–24.
Principles of Complier Design—Aho and Ullman—1977, pp. 5–11 and 518–521.
IBM Technical Disclosure Bulletin, vol. 24, No. 10, Mar. 1982, pp. 5191–5192, "Hybrid Man–Machine Interface", by H. Kasuga.

Primary Examiner—Gary V. Harkcom
Assistant Examiner—Phu K. Nguyen
Attorney, Agent, or Firm—J. F. Villella, Jr.; H. St. Julian

[57] ABSTRACT

A method for creating on-line presentations on a computer display using a complier, a compressor, and a processor. The complier converts control commands in source code format into object code format in order to specify how the information in an on-line presentation is to be presented on the display. The complier also creates a file identifying the image data to be used in the presentation. This file contains the names of the display units describing the image data used to indicate which of the uncompressed image data is to be operated upon by the compressor. The compressor formats and compresses the displayable picture elements of text and graphic shapes which have been used to create the on-line presentation. The processor then loads and executes the object code of the control commands with its corresponding picture elements of image data to create the on-line presentation. The control commands are generated totally separate from the image data.

7 Claims, 6 Drawing Sheets

```
The keyboard lets you control your computer.
It's easy to use yet flexible enough to work for
all types of applications.

N = Next Panel      P = Previous Panel      Esc = Menu
```

METHOD FOR IMPLEMENTING AN ON-LINE PRESENTATION IN AN INFORMATION PROCESSING SYSTEM

TECHNICAL FIELD

This invention relates to information processing, and more particularly to the creation of on-line presentations in an information processing system.

BACKGROUND ART

By way of background, on-line presentations in an information processing environment include such items as product demonstrations, tutorials, and other programs in which a computer display is used to present information. The development of an on-line presentation includes two separate tasks. The first task involves defining the content of the presentation, i.e., the text, illustrations, structure, sounds, and operator interaction. The second task involves writing the computer code required to implement the presentation as previously defined. Heretofore, a separate unit of code must be written for each section of an on-line presentation. Accordingly, whenever one was creating an on-line presentation, one was limited to the text, illustrations, and structure for which computer code had been specifically written. If one wished to deviate from the text or illustrations or structure provided by the information processing system, then one was required to write a separate piece of dedicated code to accomplish the change. A consequence of this fact is that a skilled programmer was required each time any non-standard presentation was required in order to write the code demanded by the format of the presentation. One who was not a skilled programmer was not ordinarily able to perform this task.

It would be most desirable to provide a method for creating on-line presentations whereby the need for separate specialized implementations in the form of computer code for each on-line presentation would be substantially eliminated. Attendant with this would be the elimination of the requirement to have a skilled programmer in order to create any non-standard on-line presentation. In addition to reducing the complexity of creating an on-line presentation, it would also be very desirable to quickly display an on-line presentation while it is being created.

U.S. Pat. No. 4,454,576 discloses a report preparation system for use in a digital signal processor for assembling multiple report definition instructions in order to create a shell document. The shell document is used to generate a file report. The system of this invention enables an operator of the system to depress a key to call up an instruction menu and select for display the report definition instruction menu. The operator then chooses in any desired order the required report instructions, and then the system inserts chosen instructions in proper order to build the shell document. The resulting shell document is stored in machine dependent language in order to enable the document to be redisplayed in operator dependent language as determined by the program which is loaded into the processor of the system.

U.S. Pat. No. 4,435,777 discloses a method for assisting an operator of an interactive text processing system in entering instructional data. Such instructional data defines to the text processing system changes to stored spatially related data. According to the method, the operator identifies to the system the task to be accomplished and also the name and location of the source file in the system. The system displays to the operator on the screen of the display, the header portion of the file which defines the fields or column names. Further, the system converts sequences of operator keystrokes which represent conventional text editing operations on selected fields of the displayed header to instructions for use by the system in processing records of the file.

U.S. Pat. No. 4,503,515 discloses a word processing system with footnote assembly management. The system includes the ability to manage assembly and formatting of footnotes and body text. After the preparation and separate storage of both the body and footnote text, assembly of the footnote text with the body text is accomplished for a review of the appearance of the text document in the format in which it is to be printed. The system and method thereof provide two techniques to an operator for providing optimum performance. The selection of the two techniques is determined by the amount of footnote text being assembled and/or the body and footnote text edited.

IBM Technical Disclosure Bulletin, Vol. 24, No. 10, March, 1982, pages 5191–5192, "Hybrid Man-Machine Interface" by H. Kasuga, discloses an interface which allows any user to operate a workstation, such as a word processor, by providing a system driven interface on top of a user driven interface. The interface disclosed is usable by a skilled or an unskilled user. The system driven interface is used by the unskilled user in order to determine which keys must be depressed in order to perform a desired function. The user driven interface is used by a skilled user in order to perform a desired function through a sequence of keystrokes.

In addition to lessening the requirements for dedicated programming support during the creation of an on-line presentation, it would be also desirable to separate the data forming the presentation from the control information used to assemble and present the on-line presentation. A result of this separation would be to make easier the task of translating a presentation from one language to another, such as from English to French. This task would be made easier because there would be no need to recompile the source code control command data during the translation process.

DISCLOSURE OF THE INVENTION

It is an object of this invention to provide an improved information processing method.

It is another object of this invention to provide a method or enabling the creation of on-line presentations on a computer display which separates the programming from the information to be displayed.

In accordance with these and other objects of the invention, a method is provided for creating on-line presentations such as product demonstrations, tutorials, and other programs in which a computer display is used to present information. The on-line presentations are implemented using a compiler, a compressor, and a processor. The compiler converts control commands in source code format into object code format. These control commands specify how the information in an on-line presentation is to be presented on the computer display. The compiler also creates a file identifying which display units, containing the image data to be displayed, will be used. The compressor formats and compresses the displayable picture elements of text and graphic shapes which have been used to create the on-line presentation. The file containing the list of display units is used to indicate which of the uncompressed image data is to be operated upon by the compressor. Finally, the processor loads and executes the object code of the control commands with its corresponding picture elements of image data to create the on-line presentation.

The display units which are contained in the file created by the compressor may contain two types of data. The first type is ASCII type data while the second type is all points addressable (APA) type data. The ASCII type data is limited to the 254 ASCII character set. The APA data can be used to present curved lines and more intricate picture graphics as well as the 254 ASCII characters.

The on-line presentation which can be created by the apparatus and method of the invention is analogous to a literary work such as a book. The presentation is broken down into a plurality of sections, equivalent to the chapters in a book, and the sections are each broken down into a plurality of panels, each of which are equivalent to a page in a book. When the processor runs the presentation, encoded instructions and data images are loaded for one section. The encoded instructions are used to display the image data and perform other operations, beginning with the first panel in the section.

BEST MODE FOR CARRYING OUT THE INVENTION

Figure 1:
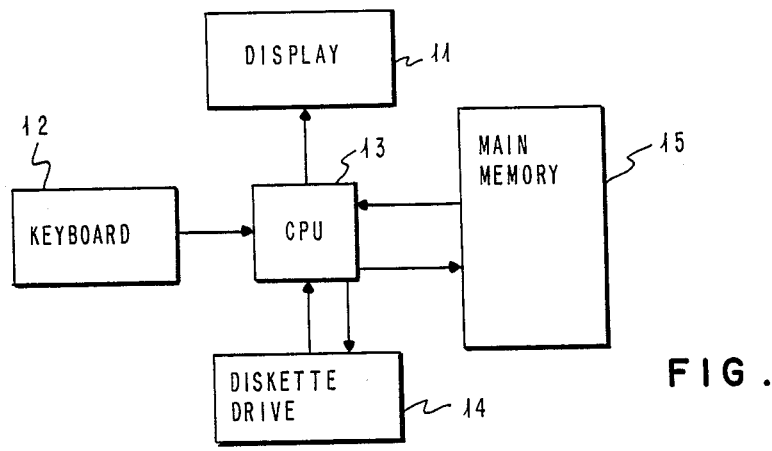
FIG. 1 is a functional block diagram of the system according to the present invention.

The system used to enable the operation of the present invention is shown in FIG. 1. Both the control commands and image data used to create the on-line presentation is input to CPU 13 using keyboard 12. This information is then stored in main memory 15 during the creation of the on-line presentation. Since main memory 15 is a random access memory (RAM), the on-line presentation, including both image data and control data is stored on a diskette in diskette drive 14. During the creation of the on-line presentation, display 11 may be used to look at the presentation. An on-line presentation may be created in one iteration or in several iterations with each iteration stored on diskette. When it is desired to continue or edit the presentation, the information stored on diskette is then loaded into main memory 15 by CPU 13.

The on-line presentation created using the system of FIG. 1 normally contains a plurality of sections, each analogous to the chapters in a book. Additionally, each section comprises a plurality of panels, with each panel analogous to one page in a book. While creating or editing the on-line presentation with the system of FIG. 1, CPU 13 loads control commands in source code format from diskette into main memory 15. These control commands in source code format may include 1 to 50 sections. Attendant with the loading of sections is the loading of each and every panel contained within the particular sections. As a result, any one of the plurality of panels contained within the loaded sections may be operated upon. In the best mode described herein, a section can contain up to 128 panels.

Figure 2:
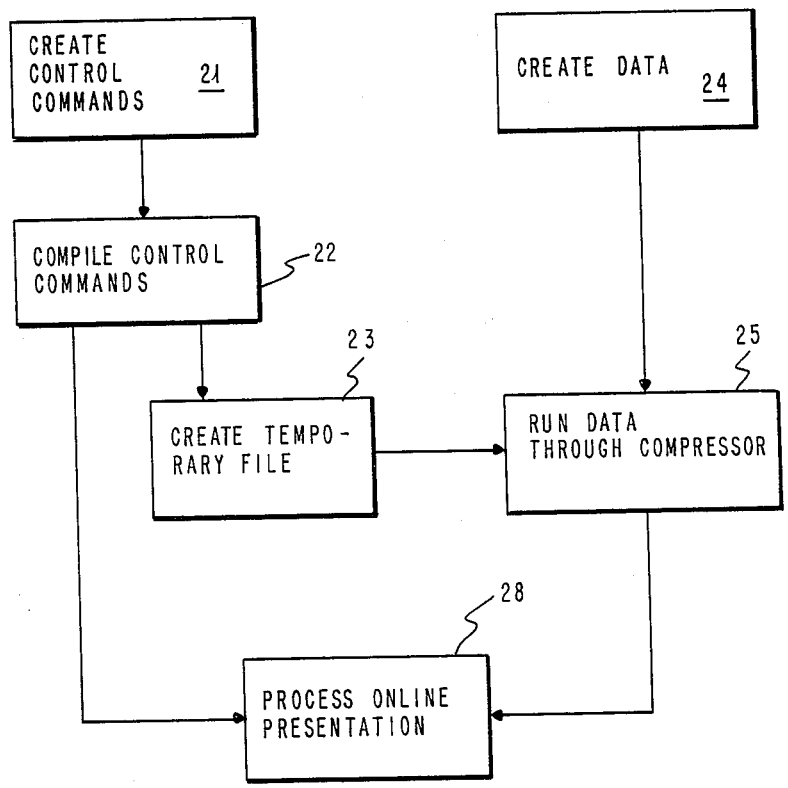
FIG. 2 is a flow chart of the overall operation of the system according to the present invention.

In operation, uncompressed image data is input using keyboard 12 as shown in step 24 (see FIG. 2). Also using keyboard 12, the control commands which define how the image data created in step 24 is to be displayed is input as shown in step 21. An important feature of the present invention is that the control information, in the form of control commands, is input totally separately from the image data. Using keyboard 12, the image data is input using the system of FIG. 1 and the control commands are also input to the system of FIG. 1 using keyboard 12. In step 21, a list is also generated which specifies the display units which are required to create the appearance of the on-line presentation. A display unit is the basic unit of data input in step 24 and may be either ASCII or all points addressable (APA).

In step 22, the control commands selected in step 21 which were in source code format are then compiled. This compiling operation converts the control commands from the source code format into an object code format. The compiler is loaded from a diskette into main memory 15 during the creation of an on-line presentation. The compiling is then carried out by CPU 13 using the compiler program. Compilers for converting source code into object code are well known in the art and consequently, the compiler used herein will not be discussed further. In addition to converting the control commands into object code format, the compiler also creates a temporary file as shown in step 23. This temporary file is used in step 25 to control the compression of the image data created in step 24. The temporary file created in step 23 informs the compressor which of the uncompressed image data files are to be compressed and packaged together in order to create the visual appearance of the on-line presentation. The temporary file created in step 23 provides a listing of all display units needed in the on-line presentation. This listing of all display units enables the compression of the required image data in step 25. Note that a display unit is a unit of image data stored in a file. More than one unit may be stored in a file. Consequently, the operation performed in step 25 formats and compresses the displayable picture elements of text and graphic shapes which have been created in step 24.

Finally, in step 28 the object code control commands which have been compiled in step 22 are loaded, one section at a time, and executed with the corresponding picture elements compressed in step 25. Once the control commands in the form of object code have been executed with the corresponding picture elements, a complete section of an n-line presentation may then be seen on display 11.

Figure 3:
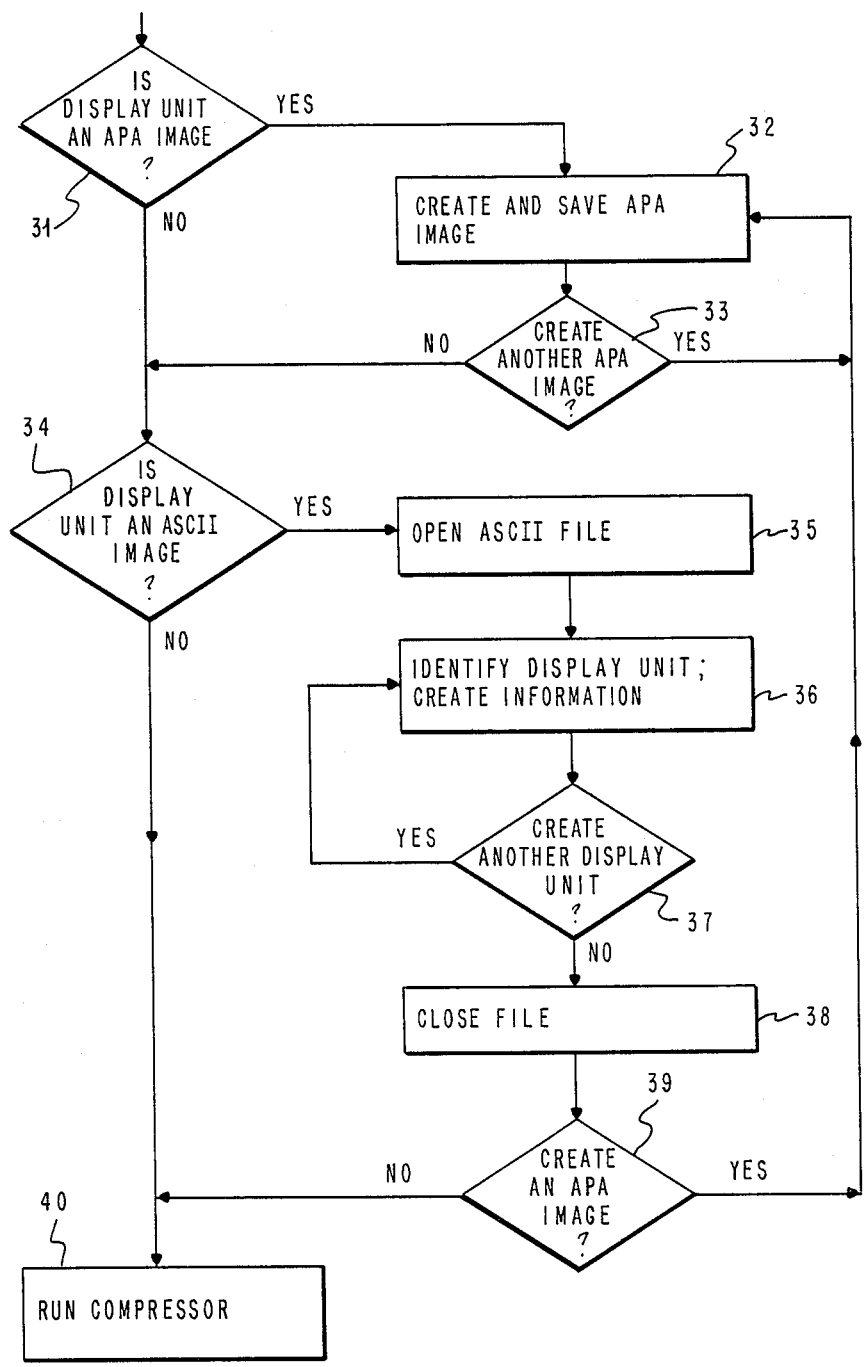
FIG. 3 is a flow chart depicting the operation involved during the creation of image data in the system of the present invention.

The operation of step 24, wherein image data is created, will now be shown in more detail with respect to FIG. 3. In decision block 31, a determination is made as to whether the next display unit is to be an APA image.

If the answer is yes, then a branch to step 32 is made wherein the APA image is created and saved on a diskette in diskette drive 14. Subsequently, decision block 33 is reached wherein a decision is made as to whether or not another APA image is to be created. If the answer is affirmative, then step 32 is repeated. However, if the answer to either decision block 31 or decision block 33 is no, thereby indicating that an APA image is not to be created, then decision block 34 is reached. In decision block 34, a determination is made as to whether or not the next display unit is an ASCII image. If the answer is negative, then as shown in step 40, the compressor (step 25 of FIG. 2) is run.

However, if the answer to decision block 34 is yes, then as shown in step 35, an ASCII file is opened. It should be noted that an unlimited number of display units may be stored in any ASCII file, limited only by the amount of space in a file. This is in contrast to an APA image wherein only one APA image may be stored per file. After the ASCII file is opened, then as shown in step 36, the display unit containing the ASCII image is identified as to its name and size. Then, the information that is going to be displayed is created, i.e., entered via keyboard 12. Next, decision block 37 is reached wherein a determination is made as to whether or not another ASCII display unit is to be created. If the answer is yes, then a branch is made back to step 36 to identify the display unit and to create the information. However, if the answer is no, then as shown in step 38 the ASCII file is closed. Finally, in decision block 39, a determination is made as to whether or not another APA image will be created. If the answer is no, then as indicated in step 40, the compressor operation is initiated. However, if the answer is yes, then a branch is made back to step 32 wherein the APA image is created and saved on diskette.

Figure 4:
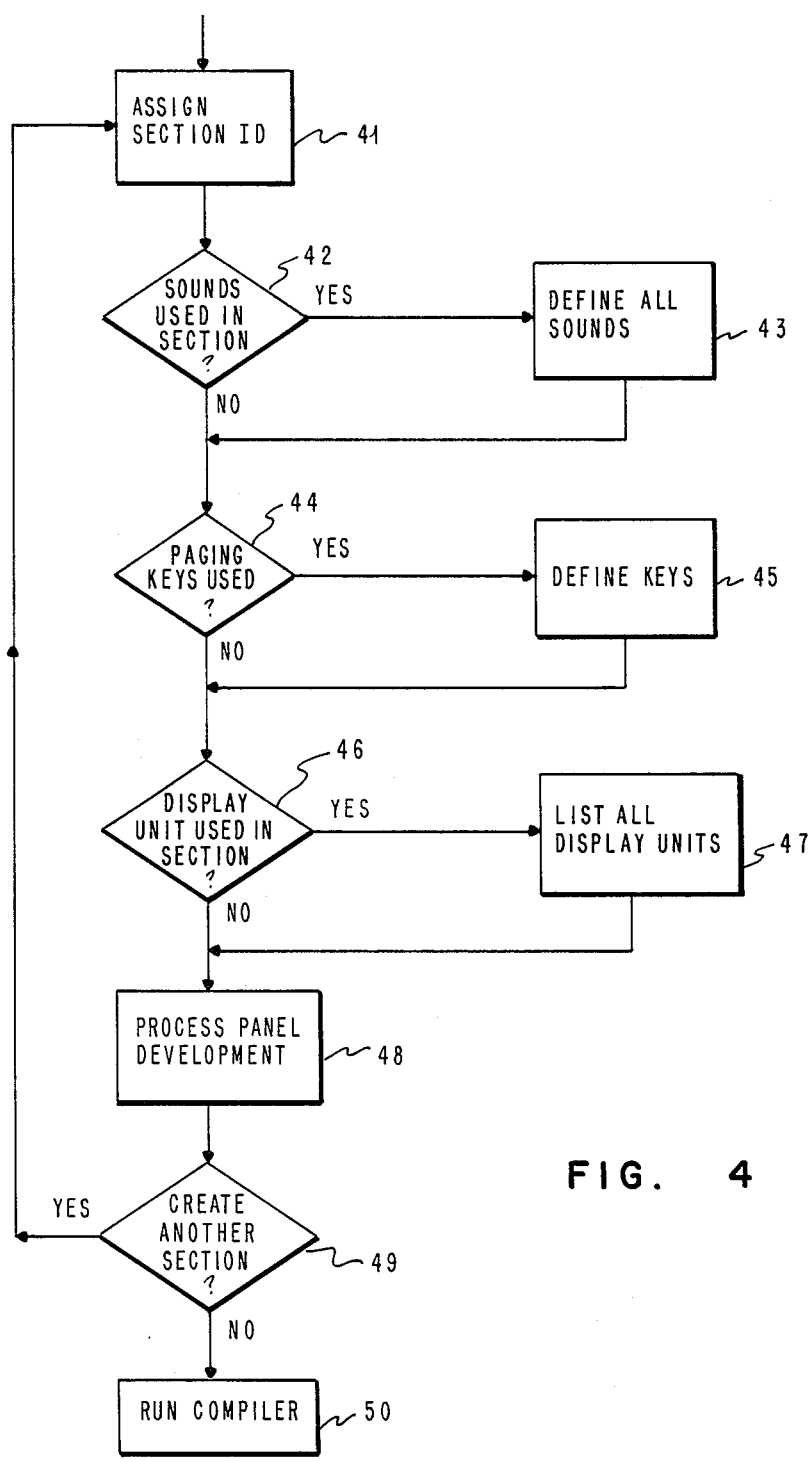
FIG. 4 is a flow chart depicting the creation of section control commands in the system according to the present invention.

Whereas FIG. 3 described the operation of the present invention with respect to the creation of image data, FIGS. 4 and 5, which will now be explained in more detail, describe the input and operation of control commands according to the present invention. FIG. 4 describes the operation of control commands with respect to sections in an on-line presentation, while FIG. 5 describes the operation of control commands with respect to panels within a section in an on-line presentation.

When a section is created, the control commands are input as shown in step 21 (see FIG. 2). At this time, as shown in step 41 (see FIG. 4), an ID is assigned to the particular section. Subsequent to the assignation of a section ID, a determination is made as to whether or not sounds will be used in the section of the presentation as shown in decision block 42. If the answer is affirmative, then as shown in step 43, all sounds used in this section are defined. After this is done or if no sounds are to be used in this section, then a determination is made in decision block 44 as to whether or not any paging keys will be used in the section. By this is meant whether or not any keys with functions such as to go to the next panel or return to a previous panel will be active in all panels of this particular section. If the answer is affirmative, then all keys are defined as shown in step 45. After this has been done or if no paging keys are used in this section, then a determination is made in decision block 46 as to whether or not a particular display unit is to be used in the section, that is, the particular display units required in the on-line presentation are identified. This is done as shown in step 47 wherein all display units forming the image data are identified. This identified display unit data is used to create the temporary file as shown in step 23 of FIG. 2. After the identification of all display units or after the determination that a particular display unit is not used, then as shown in step 48, a panel development process is enabled in order to create up to 128 panels for this particular section. The operation of step 48 will be shown in more detail with respect to FIG. 5 wherein panel control commands are input. Subsequent to the creation of all panel control commands, i.e., the last panel in a section is completed, a determination is made in decision block 49 as to whether or not another section is to be created. If the answer is affirmative, then a branch is made back to step 41 for identifying this next section. However, if the answer is no, then as shown in step 50, the section control commands which have already been created are then compiled as previously explained with respect to step 22 of FIG. 2.

After a section has been identified and a determination made as to the sounds, paging keys and display units to be used in the section, then the control commands used in each panel of the loaded section can be input to the system of FIG. 1 using keyboard 12. As shown in FIG. 5, the first step as shown in block 51 is to assign a panel ID. Next, a determination is made if a video mode other than a default mode is wanted for this particular panel. If the answer is yes, then as shown in step 53 a panel video mode is specified. After the specification of the panel video mode or after determination that the default mode will be sufficient, then a determination is made in decision block 54 as to whether or not any paging keys in this panel are to be disabled. If the answer is yes, then the disabled paging keys are specified as shown in step 55. Following this procedure, determinations are made in blocks 56 and 58 as to first, whether or not any data and/or sounds are used in the panels and second, whether or not the keyboard input will be monitored. If data is to be displayed and/or sounds are to be used in the panel, then as shown in step 57, these data and sounds as well as their timing for the panel are specified. Finally, if certain single characters or strings of characters input by keyboard 12 are to be monitored, then this is specified and the actions taken upon the keyboard input are specified as shown in step 59. For example, if a certain key were depressed, thereby requiring a jump to another panel or section, then this would be specified in step 59.

After decision blocks 52, 54, 56 and 58 have been executed, then in decision block 61 a determination is made as to whether or not another panel in this section is to be created. If the answer is yes, then a branch back to step 51 to assign an ID to this next panel is performed. However, if the answer to decision block 61 is no, then in decision 62 a determination is made as to whether or not another section is to be created. If another section is to be created, then as shown in step 63, the section development is processed in accordance with the flow chart of FIG. 4. However, if no additional section is to be created, then step 64 is carried out wherein the control commands created to this point are compiled as previously explained with respect to step 22 (see FIG. 2).

Figure 5:
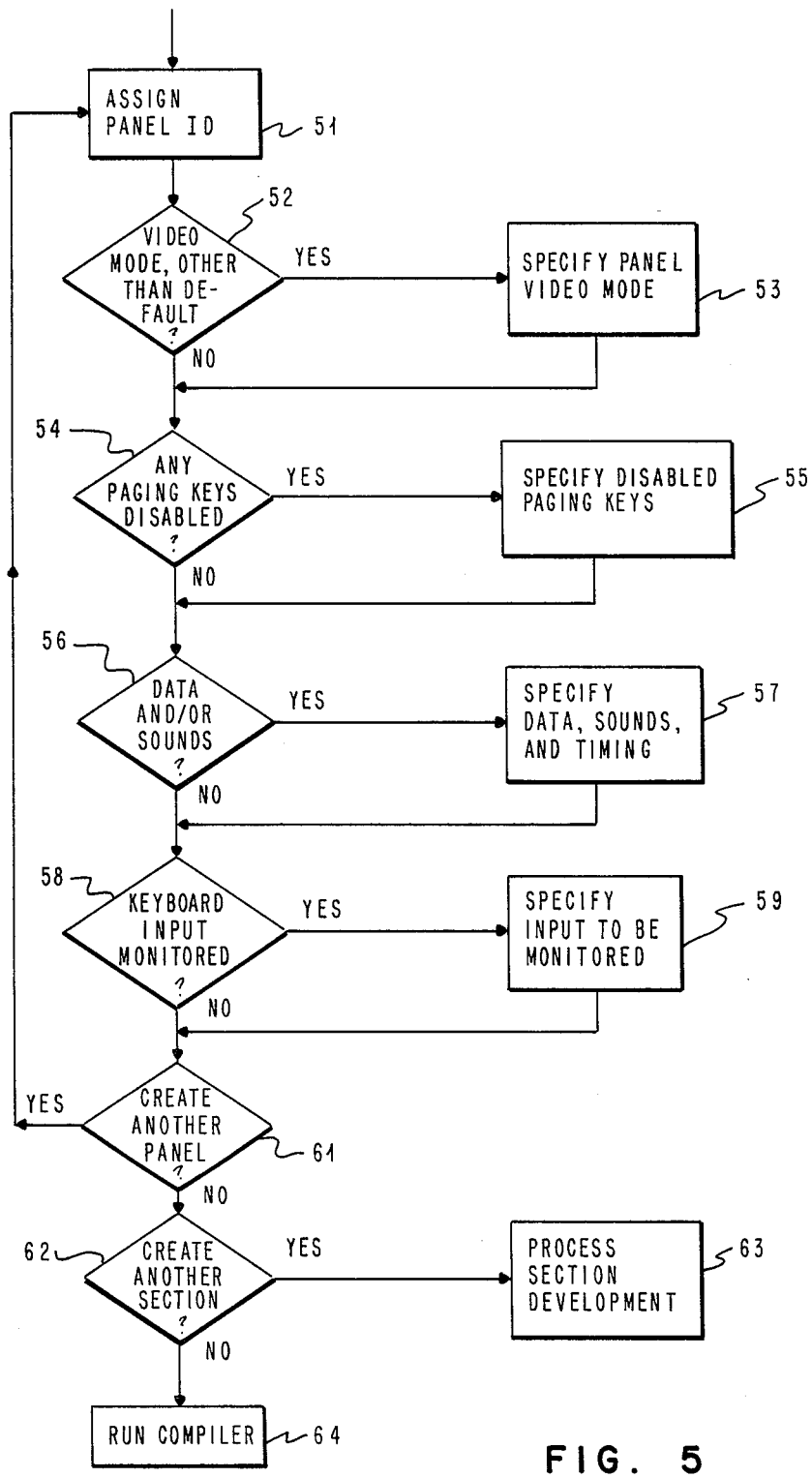
FIG. 5 is a flow chart depicting the creation of panel control commands in the system according to the present invention.

By continued iterations of the flow charts in FIGS. 4 and 5, the entire on-line presentation may be created a section at a time. Recall that FIGS. 4 and 5 demonstrate the creation of control commands while FIG. 3 describes the input of image data to the system of FIG. 1.

Figures 6A, 6B:
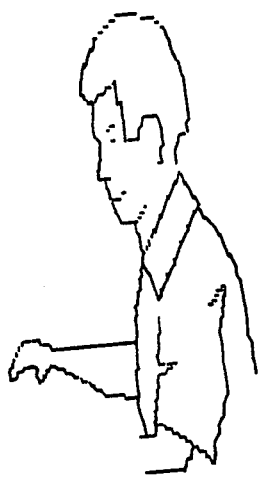
FIG. 6a is an example of image data entered in an all points addressable format.
FIG. 6b is an example of image data entered in an ASCII format.
Figure 7:
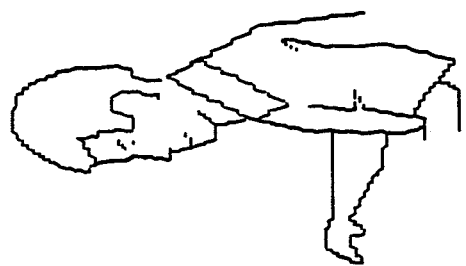
FIG. 7 is an example of a panel in a section shown on a display.

An example of how image data is entered into the system and forms a panel of a section using the appropriate control commands will now be explained with reference to FIGS. 6a, 6b, and 7. FIG. 6a is an example of image data in an APA graphics format depicting the outline of a man. This image data could be entered into the system using such devices as a screen generator or a mouse. The entering of such APA graphics data into a system is well known in the art and will not be discussed further hereinafter. FIG. 6b provides an example of image data entered into the system in an ASCII format. The ASCII data provides the following message: "The keyboard lets you control your computer. It's easy to use yet flexible enough to work for all types of applications." Additionally, it tells someone using the presentation that he can turn to either the next panel in the presentation or to the previous panel in the presentation as well as to go to a main menu using an escape (ESC) key of keyboard 12. These functions were specified in step 44 of FIG. 4.

In addition to entering the above image data, the control commands used to control the presentation of the image data as previously described with respect to step 21 (see FIG. 2) must also be entered. First, a section ID is assigned as disclosed previously with respect to step 41. No sounds are used with this particular panel. However, paging keys will be used so they must be defined as shown in step 45. Specifically, these paging keys enable a user of the presentation to go to either the next panel or the previous panel depending on whether or not the N or the P keys are depressed. The escape (ESC) key is then defined to provide a menu when depressed. Additionally, as required by step 47, all display units used in this section must be defined. Consequently, the man graphic must be defined as well as the box in which the keyboard text is described and the box for the legend of the paging keys. This latter information is used to create the temporary file (step 23 of FIG. 2) which is used to compress the image data as shown in step 25 of FIG. 2 and as previously explained herein. Finally, the data to be displayed for this particular panel must be specified. First, a panel ID is assigned as described previously with respect to step 51 of FIG. 5 and then the data displayed in this particular panel is specified, as previously described with respect to step 57. This specification of data includes the man as well as the keyboard text box and the legend for the paging keys as well as their relative locations on the display. The result is shown in FIG. 7.

While the invention has been particularly shown and described with reference to a preferred embodiment it will be understood by those skilled in the art that various other changes in form and detail may be made without departing from the spirit and scope of the invention.

What is claimed is:

1. In an information processing system, a method for displaying an on-line presentation of a plurality of display units in a desired order, comprises the steps of:
   creating a plurality of display units which are combinable into a plurality of panels for said on-line presentation;
   selecting a plurality of control commands for manipulating the display of said display units, said plurality of control commands being separate from said display units;
   compiling the selected control commands;
   creating object code files from said compiled control commands; and
   displaying a plurality of said panels each of which includes a pictorial representation of said display units in response to said step of selecting said plurality of control commands in said desired order during said on-line presentation.

2. A method according to claim 1 wherein the step of compiling said control commands further comprises the step of creating a temporary file identifying the display units required in said on-line presentation.

3. A method according to claim 2 further comprising the step of compressing the display units identified by said temporary file of compiled control commands, thereby creating a compressed image data file.

4. A method according to claim 1 wherein the step of creating image data further comprises identifying each APA image created and saving each said APA image in a separate image data file.

5. A method according to claim 4 further comprising the step of identifying each ASCII image created and saving each said ASCII image in an ASCII data file.

6. A method according to claim 1 wherein the step of selecting the plurality of control commands further comprises identifying and defining each sound, paging key, and display unit used in each section of said on-line presentation.

7. A method according to claim 6 further comprising the step of specifying the control commands associated with and used in each panel of a section in said on-line presentation.

* * * * *